(12) United States Patent
Wobben

(10) Patent No.: US 6,864,611 B1
(45) Date of Patent: Mar. 8, 2005

(54) SYNCHRONOUS GENERATOR FOR SERVICE IN WIND POWER PLANTS, AS WELL AS A WIND POWER PLANT

(76) Inventor: Aloys Wobben, Argestrasse 19, D-26607 Aurich (DE)

(*) Notice: Subject to any disclaimer, the term of this patent is extended or adjusted under 35 U.S.C. 154(b) by 0 days.

(21) Appl. No.: 09/446,831
(22) PCT Filed: Jul. 7, 1998
(86) PCT No.: PCT/EP98/04202
  § 371 (c)(1),
  (2), (4) Date: Feb. 17, 2000
(87) PCT Pub. No.: WO99/03187
  PCT Pub. Date: Jan. 21, 1999

(30) Foreign Application Priority Data

Jul. 8, 1997 (DE) .......................... 197 29 034

(51) Int. Cl.[7] ............................................. H02K 19/00
(52) U.S. Cl. ....................................... 310/162; 310/269
(58) Field of Search ............................. 310/162, 68 D, 310/216, 218, 179, 180, 199, 269; 363/34, 37, 36, 45, 160, 150; 290/46, 1 A, 4 B, 7; 322/63

(56) References Cited

U.S. PATENT DOCUMENTS

| | | | |
|---|---|---|---|
| 1,369,765 A | | 3/1921 | Alexander |
| 3,857,053 A | * | 12/1974 | Yatsushiro et al. .......... 310/162 |
| 4,217,515 A | * | 8/1980 | Long et al. .................. 310/270 |
| 4,263,526 A | | 4/1981 | Taguchi et al. |
| 4,421,967 A | * | 12/1983 | Birgel et al. ................. 219/631 |
| 4,454,465 A | * | 6/1984 | Greene ......................... 322/49 |
| 4,658,346 A | * | 4/1987 | Templeton .................. 363/160 |
| 4,663,536 A | * | 5/1987 | Roesel, Jr. et al. ............. 290/7 |
| 4,851,758 A | * | 7/1989 | Osada et al. .................. 322/63 |
| 5,015,903 A | * | 5/1991 | Hancock et al. ............ 310/168 |
| 5,251,120 A | * | 10/1993 | Smith .......................... 363/44 |
| 5,455,498 A | * | 10/1995 | Kakimoto et al. .......... 318/605 |
| RE35,763 E | * | 4/1998 | Burgbacher ................... 310/51 |
| 5,925,965 A | * | 7/1999 | Li et al. ..................... 310/268 |

FOREIGN PATENT DOCUMENTS

| | | |
|---|---|---|
| AT | 352 824 | 10/1979 |
| DE | 622 115 | 11/1935 |
| FR | 1215804 | 4/1960 |
| JP | 43620 | 10/1922 |
| JP | 54-134309 | 10/1979 |
| JP | 57-097337 | 6/1982 |
| JP | 63-191864 | 12/1988 |
| JP | 7-322537 | 12/1995 |
| JP | 8-322171 | 12/1996 |

OTHER PUBLICATIONS

F. Wang, et al., Waveform Optimization Design of an AC Converter Machine, May 25, 1989, pp. 436–440, *IEEE Transactions on Industry Applications*, vol. 25, No. 3.

H. Jordan, et al., Uber Den Magnetischen Larm von Synchronmaschinen, Jan. 1, 1967, pp. 1–8, *Elektrtechnik und Maschinenbau*, No. 1.

* cited by examiner

*Primary Examiner*—Thanh Lam
(74) *Attorney, Agent, or Firm*—Merchant & Gould P.C.

(57) ABSTRACT

A synchronous generator comprising a stator and a motor movable relative to the stator. The generator contains a plurality of poles for generating electrical energy. The time behavior of the voltage induced in one or several stator windings essentially approximates the current time behavior in one stator winding or the sum of at least several component currents. The poles are positioned asymmetrically on the rotor.

22 Claims, 7 Drawing Sheets

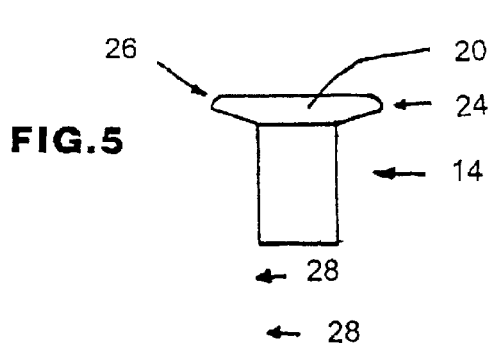
FIG. 5
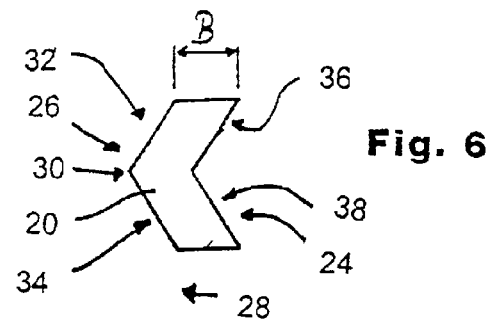
Fig. 6
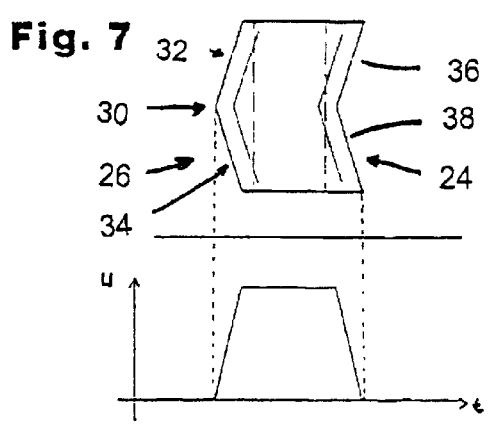
Fig. 7
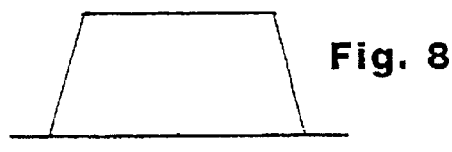
Fig. 8
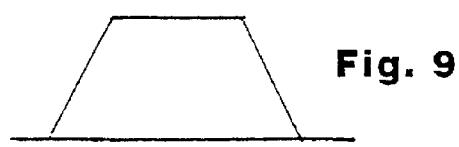
Fig. 9
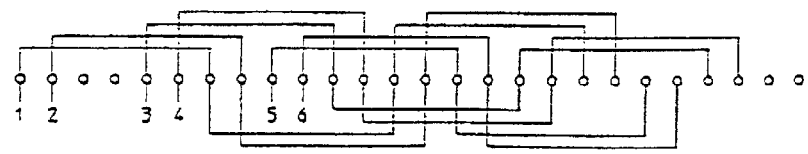
Fig. 10
Fig. 11
Fig. 12
Weg
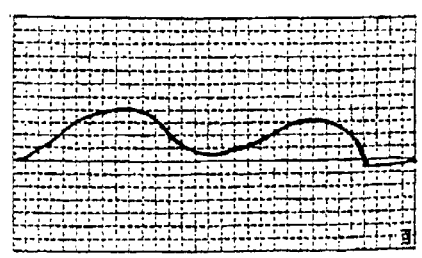
Weg Weg Weg Weg

SYNCHRONOUS GENERATOR FOR SERVICE IN WIND POWER PLANTS, AS WELL AS A WIND POWER PLANT

TECHNICAL FIELD

The present invention concerns a synchronous generator for service in wind power plants, comprising a generator-stator and generator-rotor that is free to move relative to the stator and possesses n poles, and a wind power plant with a tower, a rotor placed on the latter, as well as a generator that can be driven by the rotor.

BACKGROUND

Slowly rotating polyphase synchronous generators for service in wind power plants are known. Direct driven generators of the above type for wind power plants generally rotate at relatively slow rotational speeds in the range between 20 rpm and 40 rpm. At an output power of approximately 1 to 2 MW, the rotational speed is even lower, in the range of approximately 10 to 25 rpm. Known polyphase synchronous generators of the above mentioned type are used in the wind power plant models E-40 or E-66 of the Enercon Energieanlagen GmbH.

In these wind power plants the polyphase synchronous generator possesses a ring-shaped stator, inside of which a rotor is free to move. This rotor is connected directly, without the interposition of gears, to the rotor of the wind power plant. The rotor is executed as a salient-pole machine and comprises a multitude of poles with pole shoes, also known as pole pieces.

The objective in the construction and design of the generator is to, as much as possible, reduce noise generated during the operation of the wind power plant, so that the impact on the environment may be reduced, and the general acceptance of wind power plants may be improved.

Conventional generators can not always achieve the required low noise emissions since they are subject to strong mechanical vibrations during operation, which can be transferred to other components of the wind power plant, such as the rotor, the nacelle, and the tower, and there can lead to unwanted noise emission. Noise emission is especially high when the stator of the generator or other components are stimulated to vibrate at their so-called natural frequency.

The objective of the present invention is to specify a method, a generator, and a wind power plant, that eliminate the above mentioned problems.

This objective is met by a method and a synchronous generator having the features as defined in claims 1 and 4. The secondary claims describe preferred further developments.

SUMMARY

The invention is based on the principle that every torque variation of the generator can be the cause for the vibrational excitation of the generator or another component of the wind energy converter. This is even more relevant for ring generators, since very large torque values can arise. The torque of the generator is proportional to the direct current in a stator winding after the coupling behind the rectifier diodes. The following equation applies:

$$M = P/? = I_d \times U_d/?$$

Where P is the effective power, M the torque, ? the angular frequency, $I_d$ the direct current, and $U_d$ is the D.C. voltage.

Since $U_d$ is constant (constant voltage D.C. link) we find: $M(t) = I_d(t)$, with $I_d$ the sum of all currents. Thus, the torque M is directly proportional to the sum of all component currents.

If the time behavior of a component current, or a sum of several component currents, is matched to the time behavior of the voltage induced in the stator, whereby the time curve of the induced voltage is essentially trapezoidal, then the use of rounded edges on the lower as well as at the upper corners of the trapezoid can minimize torque momentum fluctuations. It has been shown that the implementation of the above mentioned current and voltage shapes can not only drastically reduce the forces acting along the circumference from one stator slot to the next one, but can also significantly smoothen the time behavior of the tangential force along the circumference from one stator slot to the next one, the overall effect of which is a significant reduction in the vibrational excitation, which finally leads to a significant reduction of the operational sound level of the synchronous generator. The desired wave forms of current and voltage can, for example, be achieved by implementing the following important measures at the rotor:

a) An asymmetrical distribution of the individual poles along the circumference of the magnet wheel;

b) Changing the pole shoe geometry in such a way that the pole piece, if seen from above, is designed essentially arrow-shaped, and in its cross section approximates a trapezoidal shape.

To achieve the objective of noise reduction, both these measures can be implemented separately or in combination with other measures that are implemented at the generator.

In conventional rotors of polyphase generators, the individual poles are arranged at constant distances from each other. In such a distribution, where all poles are at equal distances along the circumference of the rotor, the leading and trailing pole shoe edges all pass an opposing stator slot located on the stator in synchronized fashion, at an identical point in time. This leads to the generation of a mechanical impulse at every slot of the stator, which can lead to the stimulation of vibration in the stator. This is to say that through the strength of the magnetic field, the poles excite the stator into vibration. This excitation frequency $F_{an} = (n/60 \times \text{number of slots})$ can be identical to the natural frequency of the stator, so that the stator can potentially generate very loud noise.

In one of the preferred embodiments of the invention, the rotor is designed with poles at non-constant distances from each other. Contrary to conventional configurations with constant distances between poles, the variable distances between poles in this invention have the effect that no longer are several mechanical impulses, capable of stimulating vibrations, transferred simultaneously to the stator, due to poles of the rotor passing the slot of a stator. This reduces noise generation. An alternative method to achieve the invention's effect is for several poles to have pole pieces of different widths.

In a preferred manner, the rotor is designed with three different distances between poles, a, b, c (a: $t_p$; b: $t_p + \frac{1}{3} * t_N$; c: $t_p - \frac{1}{3} * t_N$). This measure increases the excitation frequency of the stator and the rotor by a factor of 3, which in turn reduces the excitation amplitude to a third of the regular excitation amplitude.

Thus it is possible to increase the exciting frequency by varying the distances between poles, and at the same time to reduce the amplitude, which has as its result that a vibrational excitation of the generator stator is made significantly more difficult. This alone leads to a considerable noise reduction.

The invention meets its objective in a synchronous generator of the previously mentioned type by using a further feature. The poles of the rotor are equipped with at least one edge that is formed at the pole piece, positioned obliquely with respect to the direction of movement of the rotor.

In a synchronous generator with the described pole pieces noise generation is strongly minimized, since the forces that act upon the stator during the operation of the generator and cause the stator to vibrate, can be significantly reduced. This is achieved through the obliquely positioned edge of the pole piece. The forces responsible for the vibrations are essentially created during the shift of the magnetic flux from one projecting fin of the stator to an adjacent fin. The projecting fins define narrow slots therebetween. The flux passes through two adjacent poles of the rotor and the air gap, as well as through a part of the stator. During the transition from one fin to the adjacent fin the magnetic flux shifts to the adjacent fin very rapidly—initially it is for an instant virtually interrupted—until the following fin reaches the position that was previously occupied by the previous fin and the magnetic circuit is again closed.

In conventional generators the edge of the fin that is leading in the rotor's direction of motion, is always at exactly right angles to the direction of motion of the rotor. The same applies to a pole shoe's edges that are trailing with respect to the direction of motion. In this right-angled configuration, the entire width of the revolving fin reaches a particular slot of the stator of the generator almost in one instant, so that the previously described shift of the magnetic flux from one fin to the following fin occurs correspondingly "abruptly". This sudden or abrupt transition results in correspondingly large forces that cause mechanical vibrations, so that loud noises are generated.

Contrary to this scenario, the oblique arrangement of the leading—with respect to the rotor's direction of motion—edge of a pole shoe in this invention achieves a gradual, non-abrupt, transition of the magnetic flux from one fin to the next, since a fin initially reaches into the range of a specific stator slot with the foremost section of the leading edge, and subsequently further portions of the fin move into the area of the slot. Accordingly, experimental trials have shown that the forces responsible for vibrational noise at the stator are significantly reduced when compared to those in conventional generators. This reduces the noise emission accordingly.

A further effect of the invention is that the time behavior of the voltages induced in the stator windings can be modified depending on the oblique shape of the edge of the pole piece.

In an especially preferred embodiment of the invention, the leading edge—with respect to the rotor's direction of motion—of a pole piece possesses two edge sections that are positioned at an angle to each other and form a point. The forces responsible for noise generation can be further reduced in this manner, and the pole pieces are designed essentially symmetrical. Hereby, for example, the point is directed towards the rotor's direction of motion, or into the opposite direction.

The edge sections are preferably at an angle of approximately 100° to 140°, preferably 120°, to the rotor's direction of motion. Thus, the width B shown in FIG. 6 of an edge section is essentially identical to the distance between slots. It has been shown that this geometry facilitates an especially low-loss transition of the magnetic flux with a corresponding low noise generation.

In a further especially preferred embodiment the rotor's poles possess at least one trailing edge on a pole piece that extends essentially obliquely with respect to the rotor's direction of motion. The edge that is trailing with respect to the rotor's direction of motion possesses two edge sections which are positioned at an angle to each other and extend in parallel to the edge sections on the leading edge, so that in a top view the pole piece essentially has the shape of an arrowhead.

In this specific embodiment, the effects that arise on the leading edge also arise at the edge that is trailing with respect to the direction of movement, so that noise can be further reduced and the voltage behavior is matched. In addition, these measures allow a closely spaced placement of adjacent pole pieces, since these have congruent shapes, and, so to speak, "fit together".

According to a further especially advantageous aspect of the invention, the cross section of a pole piece is shaped approximately like a trapezoid. Due to this, the shape of the voltage that is induced in the stator also has trapezoidal shape. The pole pieces in conventional generators have a sinusoidal shape to generate sinusoidal voltages. The invention allows the inducing of trapezoidal voltages. In a trapezoidal voltage shape the amplitude is constant over an extended time period, so that expensive direct current filters are no longer necessary or can be built considerably smaller, and thus at much lower cost. Corresponding to the voltage time behavior, this invention's generator in this embodiment delivers nearly constant torque throughout the angle of rotation. In addition, the so-called harmonic content of the torque is very low for a current converter machine. Harmonics in the torque time behavior of conventional pole pieces are disadvantageous.

In addition, a trapezoidal design of the pole piece reduces stray-field losses, which arise during the transition from one pole piece to the next. In a further development, the edges of the trapezoidal pole piece are rounded. This also serves to reduce vibrations and stray-field losses. It is of importance that the cross-section of a pole piece diminishes in its boundary area on both sides.

In the following the invention is further illustrated with reference to the exemplified embodiment shown in the drawing.

DESCRIPTION OF THE INVENTION

FIG. 5 shows a lateral view of the pole of a rotor according to this invention.

FIG. 6 shows a top view of the pole of FIG. 5.

FIG. 7 shows a top view of this invention's pole, as well as a related diagram of stator voltage versus time.

FIG. 8 shows a further diagram of stator voltage versus time.

FIG. 9 shows a further diagram of stator voltage versus time.

FIG. 10 shows a schematic representation of the stator winding as a 6-phase winding.

FIG. 11 shows a graph of force versus distance for conventional synchronous generators, illustrating the response of the tangential force along the circumference of a stator slot.

FIG. 12 shows a graph of force versus distance for this invention's synchronous generator, illustrating the response of the tangential force along the circumference of a stator slot.

DETAILED DESCRIPTION

Figure 1:
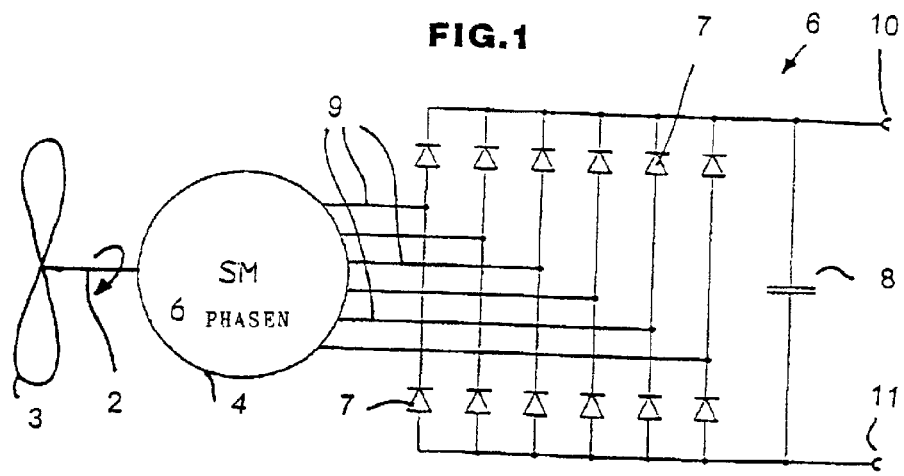
FIG. 1 shows a schematic representation of this invention's wind power plant with a synchronous generator.

FIG. 1 schematically illustrates a wind power plant according to this invention with a polyphase synchronous generator 4 that is driven directly through a shaft 2 by a rotor 3 without the interposition of gears. This synchronous generator is placed within a nacelle on a tower in a conventional manner.

The torque of generator 4 is determined by the magnetic induction B, the armature current $I_A$, and by the angle between these two quantities, while the magnetic field B can be represented by the induced voltage $U_{ind}$. This relationship is described by the equation $M \sim B \cdot I_A \sin ?T$, or $M \sim I \; U_{ind} \cdot I_A \sin ?T$ for sinusoidal currents.

The synchronous generator containing six phases is connected to a rectifier circuit 6 comprising several rectifier diodes 7 and a capacitor 8 by connecting a line 9 from one of each of the stator windings of generator 4 to a node between two rectifier diodes 7, so that during operation a rectified voltage is available at the connecting terminals 10, 11. The capacitor 8 is connected between the connecting terminals 10, 11, and after rectification provides voltage and current shapes that approximate an ideal direct current.

The current induced in the windings of the stator of generator 4, which will be described in more detail below, essentially has a direct current component and an alternating current component, compare FIGS. 23 to 25. The alternating current component is responsible for a relatively smooth current increase or decrease in a half wave of the output current of one of the 6 phases. The so-called Cos f oscillation ensures a continuous current transition from one phase to the next. The summation of all phase currents in the rectifier circuit 6 ensures that the voltage available at the connecting terminals 10, 11 and the drawn current will be essentially smooth. The capacitor 8 ensures a smoothing as well. After rectification, this invention's generator 4 supplies a direct current of nearly constant amplitude, as well as a nearly constant torque through the angle of rotation, so that direct current filters are no longer required or can be built much smaller. The harmonic content of the torque is low. In addition, this invention's generator 4 generates less noise and vibrations.

Figure 2:
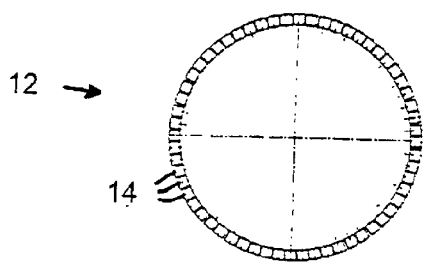
FIG. 2 shows a schematic representation of a generator rotor with variable distances between the pole shoes or pole pieces.
Figure 3:
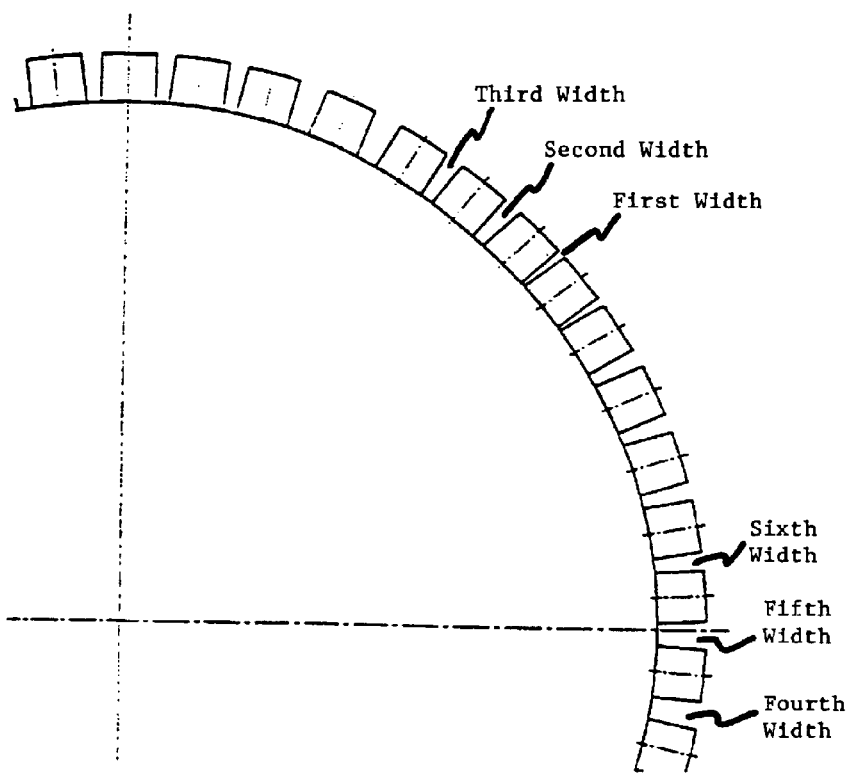
FIG. 3 shows an enlarged section of the rotor of FIG. 2.

As can be seen in FIGS. 2 and 3, the distances $t_p$ between the poles 14 along the circumference of the rotor 12 are not constant, but assume different values a, b, c, in particular a first pole distance a) $t_p$, a further pole distance b) $t_p + \frac{1}{3} * t_N$, as well as a further pole distance $t_p - \frac{1}{3} * t_N$, where $t_N$ is the width of a slot of the stator. This implements a distribution of poles that is asymmetrical along the circumference. Alternatively, or in combination with this, the pole distances can be configured by shifting one pole 14 by a specific slot width.

Such an asymmetric configuration with an offset by ⅓ of the slot width increases the excitation frequency of the stator's windings, which are located in the slots, by a factor of 3, compared to a configuration without offsets. The amplitude of the exciting force is reduced to ⅓ of the excitation in a configuration without offsets. An alternative method to implement an asymmetric configuration of the poles 14 to achieve the effect intended by the invention is to vary the widths of the pole pieces 20 along the circumference of rotor 12.

Figure 4:
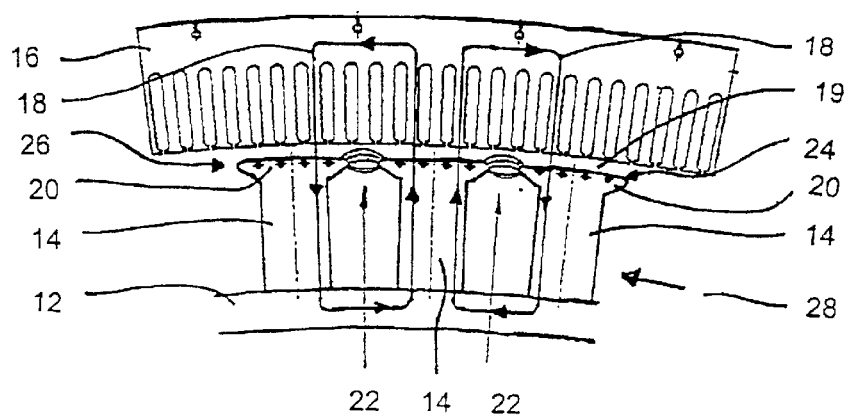
FIG. 4 shows a schematic of a section of a rotor and a stator of the synchronous generator.

FIG. 4 illustrates the magnetic flux f between the rotor 12, which contains the poles 14, and the stator 16. The magnetic flux generated by the poles 14 passes along the lines 18 through a pole 14, an air gap 19, and the iron core of stator 16, back through the air gap 18 into an adjacent pole 14 of rotor 12. A stray flux is generated between two adjacent poles 14, see arrows 22, which reduces the magnetic flux f that is useable in the electric power generation.

The rotor 12 is executed as salient-pole machine. The shape of the poles 14, in particular of the pole pieces 20, can best be seen in FIGS. 5 to 7. The side view of FIG. 5 illustrates that the pole pieces 20 have approximately the shape of a trapezoid, rounded at both edges 24, 26 of the pole piece 20. In the peripheral area of pole piece 20 the cross-section of pole piece 20 diminishes on both sides towards its end. Thus the cross section diminishes on both sides with increasing proximity to the edge.

It can be seen in FIG. 6, in a top view onto the surface of the pole piece 20 facing the air gap 18, that the pole piece 14 has the shape of an arrowhead. The edge 26, leading in the direction of motion of rotor 12, indicated by arrow 28 in FIGS. 4 to 7, possesses two edge sections 32, 34, positioned at an angle to each other, forming a point 30. These edge sections are positioned obliquely with respect to the direction of motion 28 of rotor 12, and thus with respect to the pole piece 20. The edge sections 32, 34 are positioned at an angle of approximately 120° to the direction of motion 28 of rotor 12.

The edge of a pole piece 20 that is trailing with respect to the direction of motion 28 of rotor 12 also possesses two edge sections 36, 38 that are positioned obliquely with respect to the direction of motion 28 of rotor 12. The edge section 36 is positioned parallel to the leading edge section 32, offset by the distance B (FIG. 6), and edge section 38 is positioned in parallel to edge section 34 of the leading edge 26 and offset by the distance B, so that in the view of FIG. 6 the pole piece 20 possesses an arrow shape, also known as sweep-back.

FIG. 7 shows an additional pole 14, the pole piece 20 of which in a top view is also designed in the shape of an arrow, if seen in a top view. But in comparison to the pole piece 20 shown in FIG. 6, the edge sections 32, 34, 36, 38 are at different angles to the direction of motion 28 of rotor 12.

The lower section of FIG. 7 shows a graph of the voltage U induced in the winding of stator 16 as a function of time t. The voltage shape is approximately trapezoidal, which is due to the trapezoidal configuration of pole piece 20, which is shown in a side view in FIG. 5, and in a sectional view. The induced voltage is proportional to the magnetic flux f, which is generated by the poles 20 and passes through the iron core of stator 16. The flux f is proportional to the magnetic field B. To induce a trapezoidal voltage as shown in FIG. 7, the amplitude of the magnetic field B over the distance of a pole pitch or of the pole piece 20 is trapezoidal as well. In the peripheral area of a pole piece, i.e. in the areas of the leading and trailing edges 24, 26 of pole piece 20, the amplitude of the magnetic induction B, and thus the amplitude of the induced voltage U are dependent on the geometric shape of edge 24, 26, as well as on the air gap 19. In the exemplified embodiment, the edges 24 and 26 are rounded, but they can be of different shapes to modify the shape of the areas of voltage increase or decrease of the voltage time curve between the voltage U=0 and the maximum voltage.

FIGS. 8 and 9 show graphs of the voltage U induced in the windings of stator 16 as a function of time. In alternative pole pieces, which are not shown here, in which, for example, the angle between the obliquely positioned edge sections 32, 34, 36, 38 and the direction of movement 28 of the rotor 12 is larger, and thus the arrow shape as seen in top view is more pointed, the period of increasing or decreasing voltage U will be of longer duration, while the period of constant, maximum voltage U will be of shorter duration. This is schematically shown in FIG. 9.

FIG. 8 illustrates an embodiment example of a pole piece 20, in which the angle between the edge sections 32, 34, 36, 38 and the direction of motion 28 is reduced, so that the periods of voltage increase and decrease are of shorter time duration. Thus the voltage shape can be selectively modified through the actual geometry of the pole pieces 20, in particular through their arrow shape. In addition to the voltage shape, a resultant force on the poles in the tangential direction can be modified as a function of the arrow-shape of the pole piece 20. The larger the degree of sweep-back, the smaller the tangential resultant force that is generated. When an oblique edge 24, 26 (FIG. 6 or 7) overlaps an entire slot of the stator 16, the tangential force will be very small. But even a relatively small degree of sweep-back, in which an oblique edge 24, 26 overlaps half a slot, provides a significantly more uniform time behavior of the force. This in turn reduces the noise emitted by the generator, since the amplitude of the force is the primary source of noise. Force responses are shown in FIGS. 11 to 15.

FIG. 10 illustrates the layout of windings in stator 16, which has 6 phases. Along the circumference of the stator 16 (compare FIG. 4), phase 1 is placed at 0°, phase 2 at 30°, phase 3 at 120°, phase 4 at 150°, phase 5 at 240°, and phase 6 at 270°. The stat be configured with between 60 and 100 poles (not shown). The windings can be put in place using a special winding procedure, in which all poles 14 are wound in a single pass, without the creation of contact spots, often called "bridges".

FIG. 11 is a graph of force versus distance that shows the behavior of a force acting tangentially at the circumference of a winding of stator 16 as a function of the path distance of the rotor 12 for a conventional state-of-the-art synchronous generator with a uniform distribution of individual poles along the circumference of the rotor 12. The force has a comparatively large amplitude.

FIG. 12 shows a graph of force as a function of path distance for this invention's asymmetrical configuration including an off-set of individual poles 14 by one half a slot width. The force's amplitude as a function of distance (i.e. rotation of rotor 12), and thus also as a function of time is significantly lower than for conventional generators.

Figure 13:
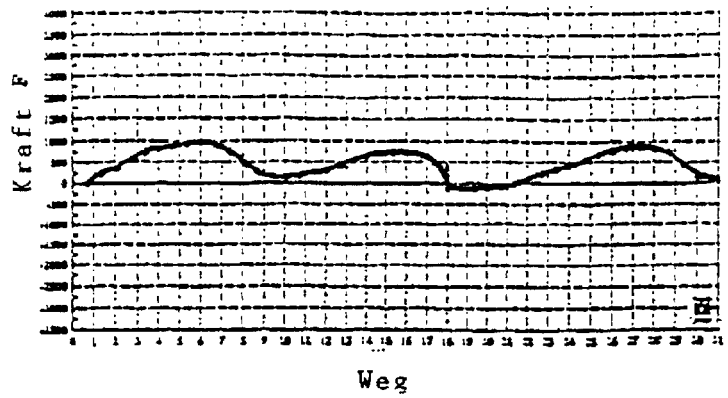
FIG. 13 shows a graph of force versus distance for an additional synchronous generator according to this invention, illustrating the response of the tangential force along the circumference of a stator slot.

FIG. 13 shows a graph of force as a function of path distance for a synchronous generator according to this invention with an asymmetrical configuration of poles along the circumference of the rotor 12, and including an offset of the poles by ⅓ of a slot width. FIG. 13 also shows that the force amplitude acting on the windings of the stator 16 is significantly reduced compared to the force arising in conventional generators. The invention considerably reduces any noise caused by these forces.

Figure 14:
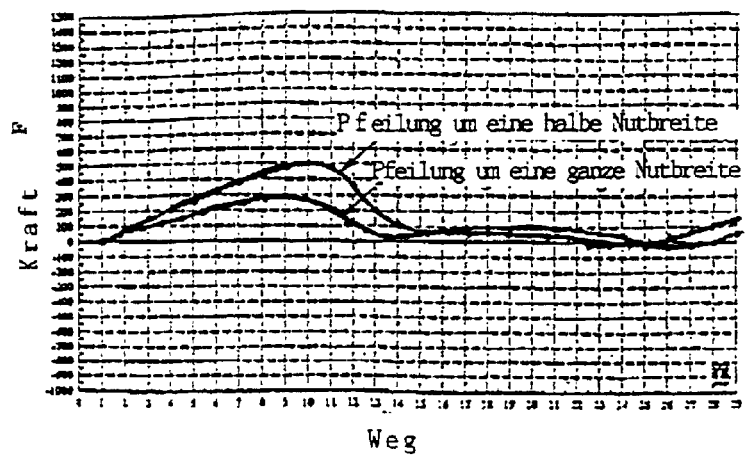
FIG. 14 shows an additional graph of force versus distance for a synchronous generator according to this invention, showing the effect of the sweep-back by one half slot width and one whole slot width.

FIG. 14 is a graph of the tangential resultant force on poles 20 as a function of path distance that illustrates that the sweep-back of the pole piece 20 in this invention is responsible for lower forces being created, compared to conventional generators. The amplitude of the shown forces is lowest when the sweep-back is executed in such a way that an edge 24, 26 of a pole piece 20, at an angle to the direction of motion 28 of the rotor 12, extends across an entire slot width. In the case of a sweep-back in which the oblique edge 24, 26 extends across one half slot width, forces are generated that are reduced if compared to conventional generators, but are still higher than the ones described above. In this manner, noise can be significantly reduced, since the amplitude of the force is the primary source of noise. A force impulse of short duration contains a very large spectrum of excitation frequencies.

Figure 15:
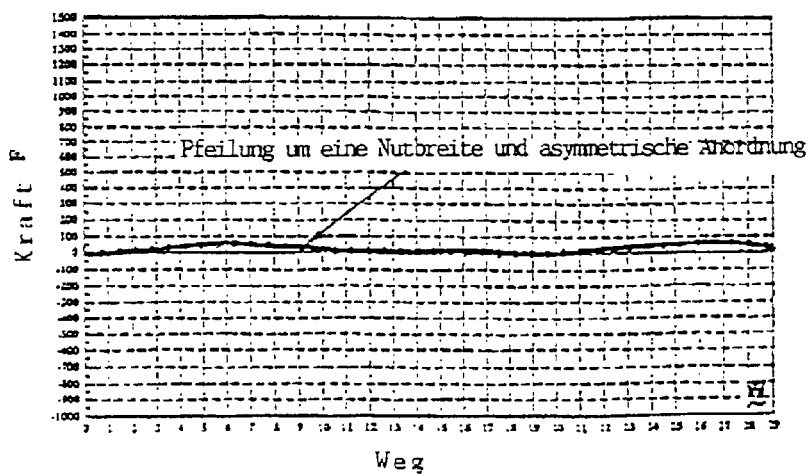
FIG. 15 shows an additional graph of force versus distance for a synchronous generator with sweep-back by one slot width and asymmetrical positioning of poles.

FIG. 15 illustrates that the noise reduction is largest if the sweep-back extends across an entire slot width, and if this invention's asymmetric configuration of poles 14 along the rotor 12 is implemented. The tangential forces that develop hereby are very small, so that a combination of this invention's two measures results in a maximum sound reduction. Hereby, the asymmetrical placement of poles 14 can be selectively chosen so that specific excitation frequencies will not arise.

FIGS. 16 to 20 show graphs of phase currents as a function of time.

Figure 16:
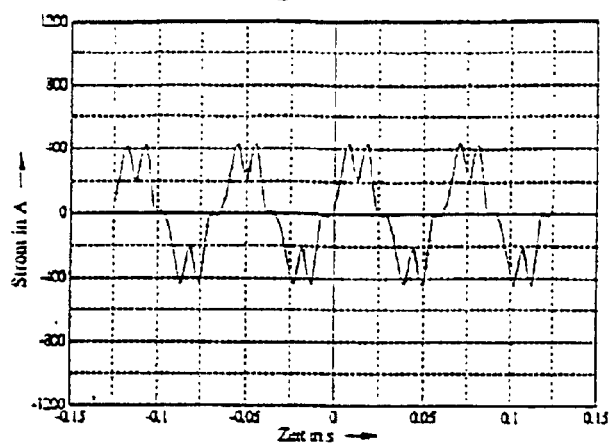
FIG. 16 shows a graph of the generator current as a function of time.

FIG. 16 shows the current time curve of one phase without the implementation of an asymmetrical configuration of poles.

Figure 17:
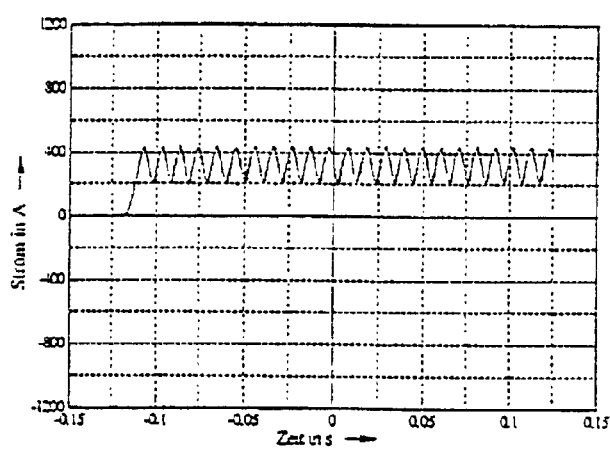
FIG. 17 shows a graph of a rectified current of a three-phase system as a function of time.

FIG. 17 shows a superposition, or summation, of two currents of a three-phase system with a current flow duration larger than 120°. The superposition is achieved using rectification.

Figure 18:
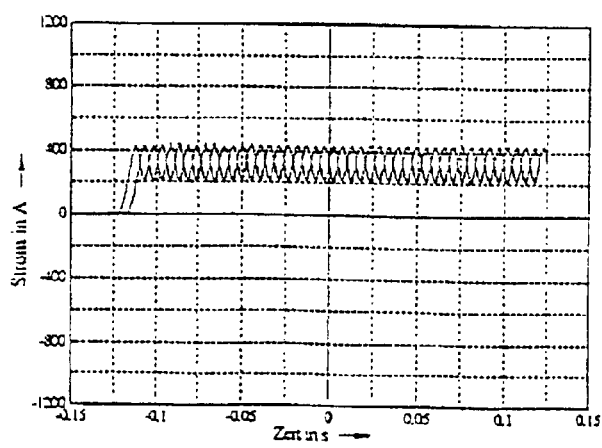
FIG. 18 shows a graph of current as a function of time according to FIG. 1 with a 30° phase shift.

FIG. 18 illustrates that an additional phase shift of 30° changes the current time behavior.

Figure 19:
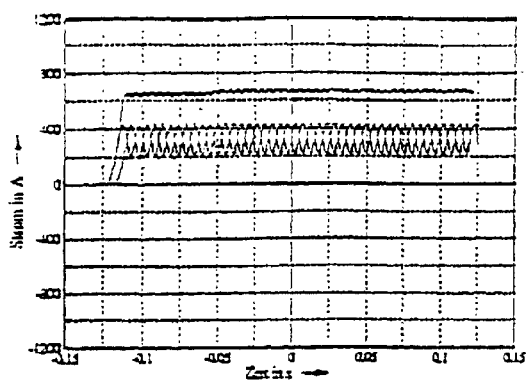
FIG. 19 shows a graph of current as a function of time as in FIG. 18 including the rectified current.

FIG. 19 illustrates the rectification of the phase currents shown in FIG. 18, whereby the resulting current is a direct current with low ripple factor. In this manner, non-sinusoidal voltages can be generated in the individual stator phases.

Taking into consideration a strongly non-linear load of the rectifier circuit 6 with capacitor 8 (compare FIG. 1), one can generate currents that, in combination with a phase shift of 30° in the stator, produce a current supply with a minimum of torque variation.

Figure 20:
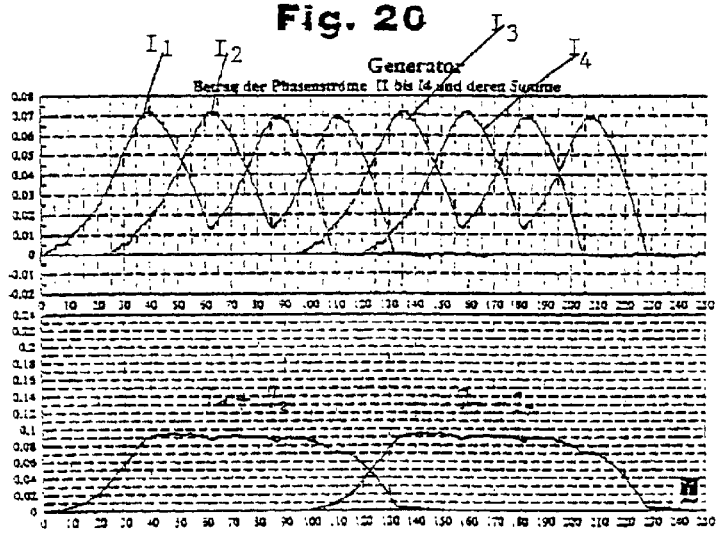
FIG. 20 shows a graph of individual phase currents and their sum as a function of time.

FIG. 20 also illustrates the values of the phase currents of several stator windings in the upper part of the diagram, as well as the sum of the values of the phase currents obtained by rectification in the lower part of the diagram.

Figure 21:
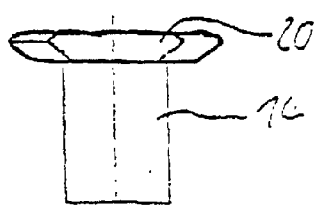
FIG. 21 shows a further exemplified embodiment of a pole piece with rounded edges according to this invention.

FIG. 21 illustrates a further exemplified embodiment of one of this invention's poles 14 with an essentially trapezoidal pole piece 20 with rounded end regions, the cross section of which diminishes on both sides.

Figure 22:
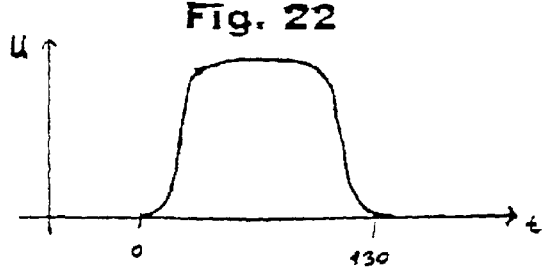
FIG. 22 shows a graph of the stator voltage as a function of time, relating to FIG. 21.

FIG. 22 shows a graph of a voltage induced in a stator as a function of time, that can be generated using the pole 14 shown in FIG. 21 and using the generator 4 of this invention. The voltage shape has rounded edges. If desired, the voltage shape can be modified by varying the shape of pole piece 20, for example by the rounded edges possessing a stronger reduction in cross sections or by being more rounded.

Figure 23:
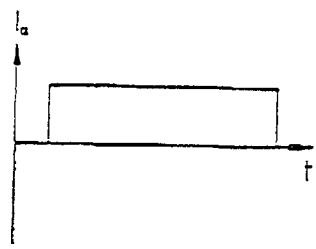
FIG. 23 shows a further graph of a current of a stator phase as a function of time.

FIG. 23 shows a graph of a square wave current as a function of time, showing the direct current component of the current induced in the windings of the generator's 4 stator, which will be described in more detail below.

Figure 24:
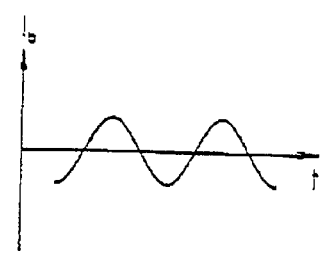
FIG. 24 shows a further graph of a current of a stator phase as a function of time.

FIG. 24 shows an alternating current component of the current induced in a stator phase. The alternating current component is responsible for a relatively smooth increase and decrease of a current half-wave of the output current of one of the 6 phases. The Cos f oscillation is responsible for a continuous current transition from one phase to the next.

Figure 25:
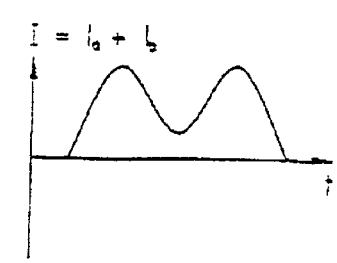
FIG. 25 shows a graph of the sum of the currents shown in FIGS. 23 and 24 as a function of time.

FIG. 25 shows a graph of the sum—a square wave with the $6^{th}$ harmonic—of the currents of one stator phase that were shown in FIGS. 23 and 24 as a function of time, as already illustrated in FIG. 20. Due to the addition of all phase currents, carried out in the rectifier circuit 6, the voltage at the connecting terminals 10, 11, and the collected current will essentially be smoothed.

| Translations of Figure captions: | |
| --- | --- |
| FIG. 11 | |
| Weg | Distance |
| FIG. 13 | |
| Kraft | Force |
| FIG. 14 | |
| Pfeilung um eine halbe Nutbreite | Sweep-back by one half a slot width |
| Pfeilung um eine ganze Nutbreite | Sweep-back by one slot width |
| FIG. 15 | |
| Pfeilung um eine Nutbreite und asymmetrische Anordnung = Sweep-back by one slot width and asymmetrical configuration | |
| FIG. 16 | |
| Strom in A | Current in A |
| Zeit in s | Time in sec |
| FIG. 20 | |
| Betrag der Phasenstroeme I1 bis I4 und deren Summe = Values of the phase currents I1 to I4 and their sum | |

What is claimed is:

1. A synchronous generator comprising:
a stator having a plurality of windings; and
a rotor having a plurality of poles, the rotor being movable relative to the stator, the poles defining a plurality of gaps, two or more of the gaps having different widths.

2. The synchronous generator of claim 1 wherein each pole has a cross-sectional area, and the cross-sectional area of at least one pole is greater than the cross-sectional area of at least one other pole.

3. The synchronous generator of claim 1 wherein the plurality of poles define a plurality of gaps, and at least one of the gaps is wider than at least one of the other gaps.

4. The synchronous generator of claim 3 wherein at least one of the gap has a first width, at least one of the gaps has a second width, and at least one of the gaps has a third width.

5. The synchronous generator of claim 4 wherein the gaps are air gaps.

6. The synchronous generator of claim 1 wherein each of the poles is formed with a pole piece, each pole piece has at least one leading edge, the leading edge extending essentially obliquely with respect to the motion of the rotor.

7. The synchronous generator of claim 6 wherein the leading edge has first and second sections, the first and second sections of the leading edge being oriented at an angle with respect to one another thereby forming a point.

8. The synchronous generator of claim 7 wherein the first and second sections of the leading edge are positioned at an angle between about 100° and about 140° relative to the direction of motion of the rotor.

9. The synchronous generator of claim 8 wherein the first and second sections of the leading edge are positioned at an angle of about 120° relative to the direction of motion of the rotor.

10. The synchronous generator of claim 6 wherein each of the pole pieces has at least one trailing edge, the trailing edge extending essentially obliquely with respect to the motion of the rotor.

11. The synchronous generator of claim 10 wherein the trailing edge has first and second sections, the first section of the trailing edge being substantially parallel to the first section of the leading edge, and the second section of the trailing edge being substantially parallel to the second section of the leading edge.

12. The synchronous generator of claim 10 wherein the leading edge is rounded and the trailing edge is rounded.

13. The synchronous generator of claim 6 wherein the pole piece has a cross-section, the cross-section having a trapezoid shape.

14. The synchronous generator of claim 13 wherein the pole piece has a center portion, a first side portion extending from one side of the center portion, and a second side portion extending from an opposite side of the center portion, the cross-section of the first side portion diminishing as it extends from the center portion, and the cross-section of the second side portion diminishing as it extends from the center portion.

15. A wind power plant comprising
a rotor;
a drive shaft connected to the rotor; and
a synchronous generator connected to the drive shaft, the synchronous generator including a stator having a plurality of windings; and a rotor having a plurality of poles, the rotor being movable relative to the stator, the poles being asymmetrically positioned on the rotor.

16. A synchronous generator comprising:
a stator having a plurality of windings; and
a rotor having a plurality of poles, the rotor being movable relative to the stator, the poles being asymmetrically positioned on the rotor, whereby the distance between adjacent poles is inconsistent.

17. The synchronous generator of claim 16 wherein no two gaps have the same width.

18. A synchronous generator comprising:

a stator having a plurality of windings; and a rotor having a plurality of poles, the rotor being movable relative to the stator, the poles defining a plurality of gaps, wherein at least one of the gap has a first width, at least one of the gaps has a second width, and at least one of the gaps has a third width.

19. The synchronous generator of claim 18, wherein no two gaps have the same width.

20. The synchronous generator of claim 18, wherein the first width is proximate the second width and less than the second width, and the second width is proximate the third width and less than the third width.

21. The synchronous generator of claim 18, further comprising a fourth width that is proximate the fifth width and greater than the fifth width, and the fifth width is proximate the sixth width and greater than the sixth width.

22. A synchronous generator comprising:

a stator having a plurality of windings; and a rotor having a plurality of poles, the rotor being movable relative to the stator, the poles having a constant width and defining a plurality of gaps, two or more of the gaps having different widths.

\* \* \* \* \*